US011922529B2

(12) United States Patent
Kuethman

(10) Patent No.: US 11,922,529 B2
(45) Date of Patent: Mar. 5, 2024

(54) ENTERPRISE SYSTEM AND METHOD FOR VENDOR LOGISTICAL VARIANCE MANAGEMENT

(71) Applicant: Hartford Fire Insurance Company, Hartford, CT (US)

(72) Inventor: David J. Kuethman, Westherfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 23 days.

(21) Appl. No.: 17/025,407

(22) Filed: Sep. 18, 2020

(65) Prior Publication Data
US 2022/0092716 A1    Mar. 24, 2022

(51) Int. Cl.
G06Q 10/06      (2023.01)
G06Q 50/28      (2012.01)
G06Q 10/0639    (2023.01)

(52) U.S. Cl.
CPC ....... *G06Q 50/28* (2013.01); *G06Q 10/06393* (2013.01)

(58) Field of Classification Search
CPC .. G06Q 50/28; G06Q 10/06393; G06F 16/00; G06F 8/20; G06F 3/34
See application file for complete search history.

(56) References Cited

U.S. PATENT DOCUMENTS

| | | | | |
|---|---|---|---|---|
| 2002/0099578 A1* | 7/2002 | Eicher, Jr. | ........ | G06Q 10/06393 705/7.39 |
| 2008/0086716 A1* | 4/2008 | Devore, Jr. | ............. | G06F 9/451 717/102 |
| 2008/0114628 A1* | 5/2008 | Johnson | ................ | G06Q 10/06 707/999.104 |

(Continued)

FOREIGN PATENT DOCUMENTS

| | | | | |
|---|---|---|---|---|
| CA | 2564847 A1 * | 2/2007 | ............. | G06Q 10/06 |
| WO | WO-2004114177 A2 * | 12/2004 | ....... | G06Q 10/06393 |

OTHER PUBLICATIONS

Gustafsson, Jeanette, and Erika Karlsson. "Supplier performance dashboard at Volvo Logistics." (2012). (Year: 2012).*

(Continued)

*Primary Examiner* — Hamzeh Obaid
(74) *Attorney, Agent, or Firm* — Buckley, Maschoff & Talwalkar LLC

(57) ABSTRACT

A computer server may receive, from a remote device, an indication of a selection of a subset of a plurality of vendor entities associated with an enterprise. The server may then access a vendor data store to obtain vendor parameters associated with the subset of vendor entities, wherein the vendor data store contains electronic records representing a plurality of vendor entities, and each electronic record includes an electronic record identifier, vendor parameters, and an electronic communication address. The server may then automatically analyze the obtained vendor parameters (Continued)

and data in a metric data store (e.g., benchmark information) to generate vendor logistical variance results for each of the subset of vendor entities. An indication of the vendor logistical variance results may then be transmitted to be displayed on an interactive graphical user interface display that includes at least one electronic communication address from the vendor data store.

17 Claims, 16 Drawing Sheets

(56) References Cited

U.S. PATENT DOCUMENTS

| | | | |
|---|---|---|---|
| 2008/0163099 A1* | 7/2008 | Gu | G06F 3/0484 715/780 |
| 2011/0061013 A1* | 3/2011 | Bilicki | G06Q 10/06393 715/771 |
| 2014/0343997 A1* | 11/2014 | Brown | G06Q 10/06312 705/7.22 |
| 2015/0006205 A1* | 1/2015 | Chase | G06Q 40/08 705/4 |
| 2015/0193709 A1* | 7/2015 | Ramesh Babu | G06Q 10/0637 705/7.28 |
| 2015/0242776 A1 | 8/2015 | Wilcox et al. | |
| 2016/0321744 A1* | 11/2016 | Bowers | G06Q 40/02 |
| 2018/0349826 A1* | 12/2018 | Estall | G06Q 10/063 |
| 2020/0027097 A1 | 1/2020 | Sargent | |
| 2020/0034772 A1* | 1/2020 | Balan | G06Q 40/125 |
| 2020/0065727 A1* | 2/2020 | Connell | G06Q 10/087 |
| 2020/0143301 A1 | 5/2020 | Bowers | |
| 2021/0065091 A1* | 3/2021 | Bhattacharyya | G06Q 10/06393 |

OTHER PUBLICATIONS

Hofmann, Martin, Florian Neukart, and Thomas Bäck. "Artificial intelligence and data science in the automotive industry." arXiv preprint arXiv:1709.01989 (2017). (Year: 2017).*

Liesbeth V, Michaël C, Anna MD, Charlotte LB, Wouter C, Dirk V. Overview of artificial intelligence-based applications in radiotherapy: Recommendations for implementation and quality assurance. Radiotherapy and Oncology. Sep. 10, 2020. (Year: 2020).*

* cited by examiner

OUTSTANDING METRICS LIST

| Director | Vendor Manager | Total Count | 1-5 Days | 6-10 Days | 11-15 Days | 16 Days+ |
|---|---|---|---|---|---|---|
| Ms. West | Ms. Blue | 1 | 1 | 0 | 0 | 0 |
| Mr. Green | Ms. Jones | 3 | 2 | 0 | 1 | 0 |
| Ms. White | Mr. Brown | 1 | 0 | 0 | 0 | 1 |
| Ms. Smith | Ms. North | 6 | 0 | 1 | 0 | 5 |

FIG. 4

SUPPLIER MANAGEMENT DASHBOARD

SUPPLIER MANAGEMENT SLA RESULTS

OVERALL VENDOR PERFORMANCE BY SUPPLIER

| Supplier | 2023 | 2024 |
|---|---|---|
| Vendor A | 90% | 88% |
| Vendor B | 86% | 91% |
| Vendor C | 77% | 86% |
| Vendor D | 94% | 88% |

OVERALL SUPPLIER MANAGEMENT VENDOR PERFORMANCE (MOM)

METRIC TRACKING

OVERALL VENDOR SLA RANKINGS

| Type | Rank | Vendor | VM | Total Yes | Total No | Score |
|---|---|---|---|---|---|---|
| Top 3 | 1 | Vendor A | VM_101 | 75 | 0 | 100% |
| | 2 | Vendor B | VM_108 | 75 | 1 | 98% |
| | 3 | Vendor C | VM_102 | 74 | 2 | 94% |
| Bottom 3 | 3 | Vendor X | VM_105 | 70 | 5 | 63% |
| | 2 | Vendor Y | VM_101 | 65 | 4 | 60% |
| | 1 | Vendor Z | VM_103 | 66 | 12 | 55% |

LOW LEVEL SCORECARDS

SUPPLIER SCORECARD

| CATEGORY | DESCRIPTION | YTD PROGRESS |
|---|---|---|
| Vendor Performance | | |
| Vendor Initiative | | |
| Financing | | |

SUPPLIER MANAGEMENT LEADER REPORT – SEP 2024

| METRIC | YEAD TO DATE | PY YTP | BEHIND THE NUMBERS | STATUS |
|---|---|---|---|---|
| Total Vendor Spend | $250M | $300M | | |
| Inhouse Vendor SLAs Met Goal | 85% | 80% | | ▨ |
| Partnered Initiative | $10M | $5M | | |

FIG. 8

| Supplier_Name | Metric_Name | Measurement | Benchmark | Direction | Metric_Type | Frequency | Target Date |
|---|---|---|---|---|---|---|---|
| Supplier A | Vendor Portal Access | % | 0.95 | Up | SLA | M | 30 |
| Supplier A | Calls Answered | # | NULL | NA | Inform | M | 15 |
| Supplier B | Billing Accuracy | % | 1 | Up | SLA | Q | 18 |
| Supplier B | Pricing Notification | # | 24 | Down | SLA | Q | 15 |

FIG. 10

| VENDOR ID 1502 | NAME 1504 | METRIC (SCORE) 1506 | DATE 1508 | ... | STATUS 1510 |
|---|---|---|---|---|---|
| V_123456 | VENDOR A | DISASTER RECOVERY (PASS) | 1/26/2022 | | GOOD |
| V_654321 | VENDOR B | CALLS ANSWERED (0.85) | 11/5/2022 | | GOOD |
| V_987654 | VENDOR C | CUSTOMER SERVICE (0.71) | 11/25/2022 | | WARNING |
| V_456789 | VENDOR D | DISASTER RECOVERY (FAIL) | 11/27/2022 | | FOLLOW UP TASK |

ENTERPRISE SYSTEM AND METHOD FOR VENDOR LOGISTICAL VARIANCE MANAGEMENT

BACKGROUND

An enterprise might interact with hundreds of different vendors. For example, an insurance companies might interact with medical service providers, vehicle repair shops, etc. in connection with insurance claims. To centralize vendor management, an enterprise may utilize a supplier management application. Such an application may, for example, help ensure contract adherence, spend control, product quality, vendor relationship management, and overall performance. Even with such an application, however, logistical issues can arise in terms of how to manage a substantial number of vendors with varying products, contractual agreements, fee schedules, performance measurements, etc.

It would be therefore desirable to provide systems and methods for an automated vendor logistical variance management platform that allow faster, more accurate results as compared to traditional approaches.

SUMMARY OF THE INVENTION

According to some embodiments, systems, methods, apparatus, computer program code and means are provided for an automated vendor logistical variance management platform that permits faster, more accurate results as compared to traditional approaches and that allows for flexibility and effectiveness when acting on those results. In some embodiments, a computer server may receive, from a remote device, an indication of a selection of a subset of a plurality of vendor entities associated with an enterprise. The server may then access a vendor data store to obtain vendor parameters associated with the subset of vendor entities, wherein the vendor data store contains electronic records representing a plurality of vendor entities, and each electronic record includes an electronic record identifier, vendor parameters, and an electronic communication address. The server may then automatically analyze the obtained vendor parameters and data in a metric data store (e.g., benchmark information) to generate vendor logistical variance results for each of the subset of vendor entities. An indication of the vendor logistical variance results may then be transmitted to be displayed on an interactive graphical user interface display that includes at least one electronic communication address from the vendor data store.

Some embodiments comprise: means for receiving, at the back-end application computer server from a remote device, an indication of a selection of a subset of the plurality of vendor entities; means for accessing a vendor data store to obtain vendor parameters associated with the subset of vendor entities, wherein the vendor data store contains electronic records representing a plurality of vendor entities, and each electronic record includes an electronic record identifier, the vendor parameters, and an electronic communication address; means for automatically analyzing the obtained vendor parameters and data in a metric data store to generate vendor logistical variance results for each of the subset of vendor entities, wherein the metric data store contains electronic records representing a plurality logistical metrics, and each electronic record includes an electronic record identifier and benchmark information; and means for transmitting an indication of the vendor logistical variance results for each of the subset of vendor entities to be displayed on an interactive graphical user interface display that includes at least one electronic communication address from the vendor data store.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to provide an automated vendor logistical variance management platform in a way that provides faster, more accurate results as compared to traditional approaches. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is an outstanding metrics list according to some embodiments.

FIG. 8 is a supplier management leader report according to some embodiment.

FIG. 10 shows metric information according to some embodiments.

FIG. 15 is a portion of a tabular vendor database according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk analysis and/or resource allocation by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately compare vendor information (including metric benchmarks), the performance and/or abilities of a computing platform, the allocation of resources, and/or the exchange of information, thus improving the overall efficiency of the computer system associated with message storage requirements and/or bandwidth considerations of an enterprise (e.g., by reducing the number of messages that need to be transmitted via a communication network). Moreover, embodiments associated with collecting accurate information might further improve risk values, predictions of risk values, allocations of resources, electronic record routing and signal generation, the automatic establishment of communication links (e.g., to help facilitate issue resolution with various vendors), etc.

Figure 1:
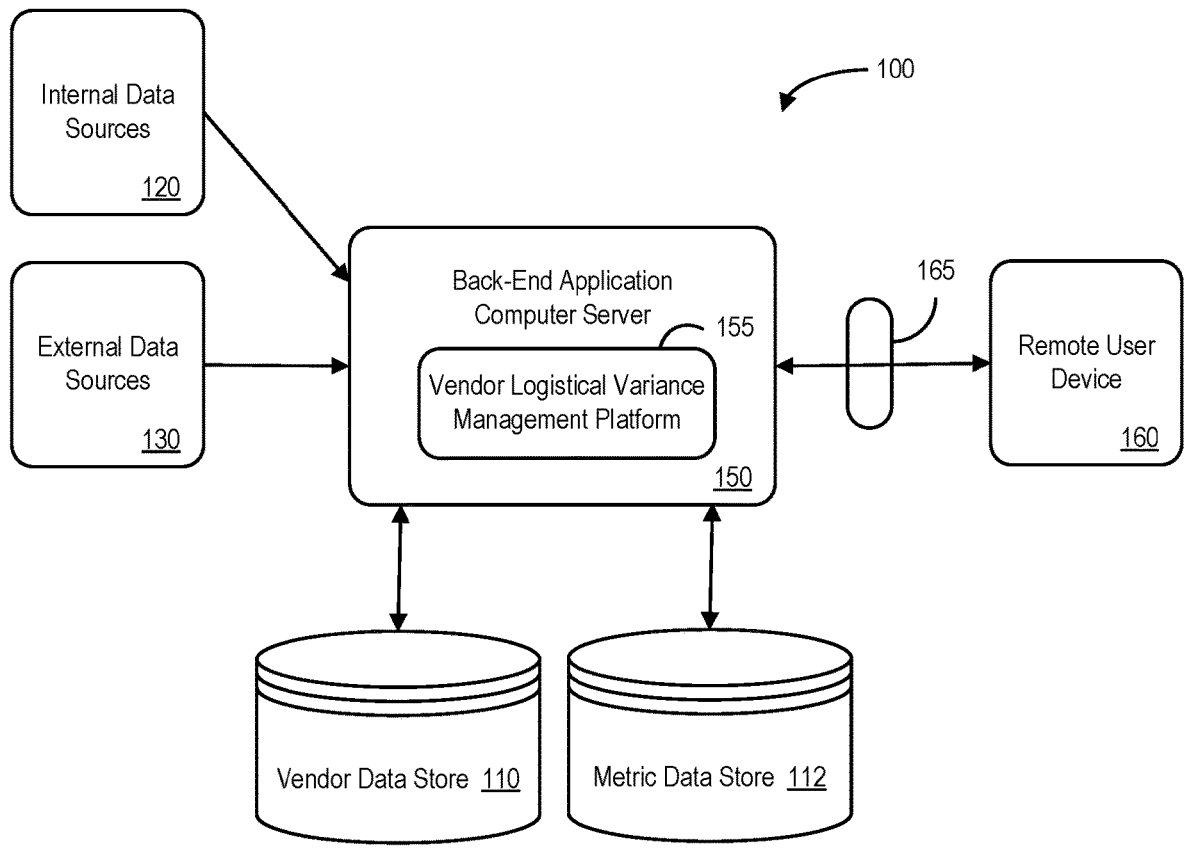
FIG. 1 is a high-level block diagram of a system architecture in accordance with some embodiments.

For example, FIG. 1 is a high-level block diagram of a system 100 according to some embodiments of the present invention. In particular, the system 100 includes a back-end application computer 150 server that may access information in a vendor data store 110 and a metric data store 112 (e.g., storing a set of electronic records associated with metric benchmarks, etc.). The back-end application computer server 150 may also retrieve information from internal data sources 120 (e.g., internal to an insurance company) and/or external data sources 130 (e.g., third-party or vendor data) in connection with an automated vendor logistical variance management platform 155. According to some embodiments, the system 100 further applies machine learning, artificial intelligence algorithms, business logic, and/or other models to the electronic records. The back-end application computer server 150 may also exchange information with a remote user device 160 associated with an enterprise operator, administrator, representative of a vendor, etc. (e.g., via communication port 165 that might include a firewall). According to some embodiments, an interactive graphical user interface platform of the back-end application computer server 150 (and, in some cases, third-party data) may facilitate the display of information associated with the automated vendor logistical variance management platform 155 via one or more remote computers (e.g., to enable a manual review of automatically generated communications) and/or the remote user device 160. For example, the remote user device 160 may receive updated information (e.g., a summary report and/or performance information) from the back-end application computer server 150. Based on the updated information, a user may review the data from the vendor data store 110 and/or metric data store 112 and take informed actions in response to communications. Note that the back-end application computer server 150 and/or any of the other devices and methods described herein might be associated with a cloud-based environment and/or a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate communications with remote user devices 160 and/or updates of electronic records in the vendor data store 110 and metric data store 112. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the vendor data store 110 and/or metric data store 112. The vendor data store 110 and/or metric data store 112 might, for example, store electronic records representing a plurality of vendors (e.g., suppliers) and/or vendor entities, each electronic record having an identifier, metric benchmark information, communication addresses, etc. The vendor data store 110 and/or metric data store 112 may also contain information about prior and current interactions with vendors, including those associated with the remote user devices 160 (e.g., user preference values associated with data formats, protocols, etc.). The vendor data store 110 and/or metric data store 112 may be locally stored or reside remote from the back-end application computer server 150.

As will be described further below, the vendor data store 110 and metric data store 112 may be used by the back-end application computer server 150 in connection with an interactive user interface to provide information about the automated vendor logistical variance management platform 155. Although a single back-end application computer server 150 is shown in FIG. 1, any number of such devices may be included. Moreover, various devices described herein might be combined according to embodiments of the present invention. For example, in some embodiments, the back-end application computer server 150, the vendor data store 110, and/or the metric data store 112 might be co-located and/or may comprise a single apparatus. According to some embodiments, the system 100 may provide an ability to compare and evaluate the performance of multiple vendors to help manage and improve vendor performance.

Figure 2:
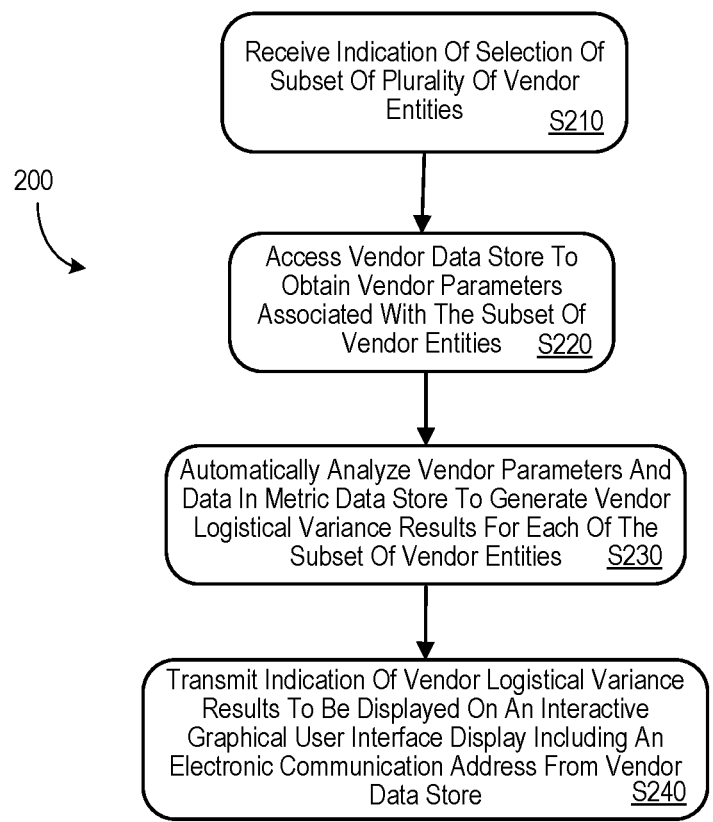
FIG. 2 illustrates a method according to some embodiments of the present invention.

Note that the system 100 of FIG. 1 is provided only as an example, and embodiments may be associated with additional elements or components. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may receive, from a remote device, an indication of a selection of a subset of the plurality of vendor entities. For example, a user might select a vendor identifier or apply a filter condition to define a subset of vendors. At S220, a vendor data store may be accessed to obtain vendor parameters associated with the subset of vendor entities. The vendor data store might, for example, contain electronic records representing a plurality of vendor entities (and each electronic record may include an electronic record identifier, the vendor parameters, and an electronic communication address such as a telephone number, email address, IP address, chat address, video communication link, etc.).

At S230, the system may automatically analyze the obtained vendor parameters and data in a metric data store to generate vendor logistical variance results for each of the subset of vendor entities. The metric data store may, for example, contain electronic records representing a plurality logistical metrics (and each electronic record includes an electronic record identifier and benchmark information). The information in the metric data store might include, for example, a metric name, a measurement type, a current benchmark, a benchmark direction, a metric type, a metric frequency, a target date, etc.

As used herein, the phrase "vendor logistical variance" may be associated with performance measurement. For example, due to a decentralized model and different needs of stakeholders, hundreds of metrics may be devised with varying cadences (most with benchmarks). The aggregation of metrics for review and analysis and comparison of metrics between programs could be a time consuming and often misleading task. Moreover, such a performance analysis may lack insight into peer actions and results (making annual staff ratings onerous) and the overall health of an organization may be difficult to quantify empirically. Thus, embodiments described herein may provide a structured way to prioritize and resolve vendor performance issues based on risk and reward.

According to other embodiments, the phrase "vendor logistical variance" may be associated with financial control. For a variety of reasons, the approach to pay vendors can differ greatly. For example, payments might be made per claim file for specific services requested, at the enterprise level through submitted invoices in a commercial vendor payment system, via a finance department (i.e., one-off payments). As a result, total payments might difficult, if not impossible, to derive from internal enterprise data. Embodiments described herein may replace and improve account receivable reporting obtained from vendors to determine overall spend. This financial insight may improve the ability to trend spend and count data to determine usage patterns, identify seasonality issues, and ensure that services are used in accordance with company policy.

Similarly, the phrase "vendor logistical variance" may be associated with relationship management. With a single vendor manager being assigned to specific accounts, awareness of individual actions such as corrective action plans, correspondence and communication with a vendor, explanations with specific issues and metrics, etc. might not be officially memorialized. Moreover, termination of employment of a vendor manager can create a risk that historical context surrounding actions and decisions will be inevitably lost, and the lack of centralized incident tracking may prevent an enterprise from analyzing and root-causing vendor actions. Embodiments may therefore avoid situations where follow-up tasks are left for a vendor manager to complete without any preferred work standards or approaches (avoid the creation of Outlook reminders, "Post-it" notes, reminder spreadsheets, etc.).

A vendor logistical variance metric might be associated with, for example, a Service Level Agreement ("SLA") metric. The SLA might be, for example, clearly defined in a vendor's contract with an associated benchmark. Failure to meet SLA's are often tied to a financial penalty. A vendor logistical variance metric might instead be associated with, for example, a Key Performance Indicator ("KPI") metric. KPIs are critical metrics that are tracked (but are not defined in the contract) and may not have penalties associated with them. A vendor logistical variance metric might also be associated with, for example, an informational ("info") metric. This might refer to any type of metric that informs the business of a specific item. Benchmarks and trend interpretations may not be required, but could in some cases apply (e.g., a volume of services performed, referrals rejected, etc.).

At S240, the system may transmit an indication of the vendor logistical variance results for each of the subset of vendor entities to be displayed on an interactive graphical user interface display that includes at least one electronic communication address from the vendor data store. According to some embodiments, a single vendor manager is associated with multiple vendor entities and vendor logistical variance results are combined and summarized for the vendor manager (to help him or her manage a group of vendors). The at least one electronic communication address on the interactive graphical user interface might be, for example, included when a vendor logistical variance results exceeds a threshold value. In this case, the backend application computer server may automatically generate a corrective action plan (e.g., using Artificial Intelligence ("AI") or Machine Learning ("ML") based on prior vendor problems and resolutions) and/or establish a communication link between the remote user device and a remote vendor device via the communication address when the threshold value is exceeded (e.g., to help a vendor manager resolve a performance issue by discussing the matter with the vendor, transmitting a corrective action plan, etc.).

According to some embodiments, vendor spend data, performance data and associated demographics are compiled into a database designed for analytical processing. The database design might be created to accommodate the following situations easily:

- a vendor provides several products/services across different program categories;
- entity resolution provides tables to let services be defined by specific criteria because an enterprise might not always capture the service type to the required level;
- an ability to split metrics under one company across products and assign multiple vendor managers per product, but still be reported out on the company as a whole if needed;
- an ability to identify key attributes like corrective action plans, geographic regions in conjunction with spend and usage patterns to easily assess gaps and overlaps in service areas;
- stored attributes of defined vendor payments that can be analyzed against company data and vendor provided data to validate invoices, identify performance issues and detect suspicious activity;
- an ability to identify services, usage patterns, affected internal stakeholders during catastrophic events to mitigate impact;
- an ability to create models to predict effects on vendor and product usage due to a variety of changes;
- historical capture and storage of volatile data (e.g., metric benchmarks, fee schedules, assigned vendor manager, etc.) for use in computing "What-if" scenarios (e.g., how many vendors would have met internal goals for customer service if we raised our minimum to 95%?"); and an ability to layer incident data with performance to identify trends and implement action plans in substantially real-time.

Embodiments may provide security to the individual user grain and audit trail tables that can capture all movements, clicks, and/or changes by a frontend user. "Normal" users may be stopped from editing SLAs that have already been submitted and a standardized process may be provided to request changes to a specific administrator, In some embodiments, tripwire alerts might be provided for situations that may warrant further investigation by company officials (e.g., an increase financial activity during low claim volume periods, corrective action plans that stop and start frequently, etc.).

Figure 3:
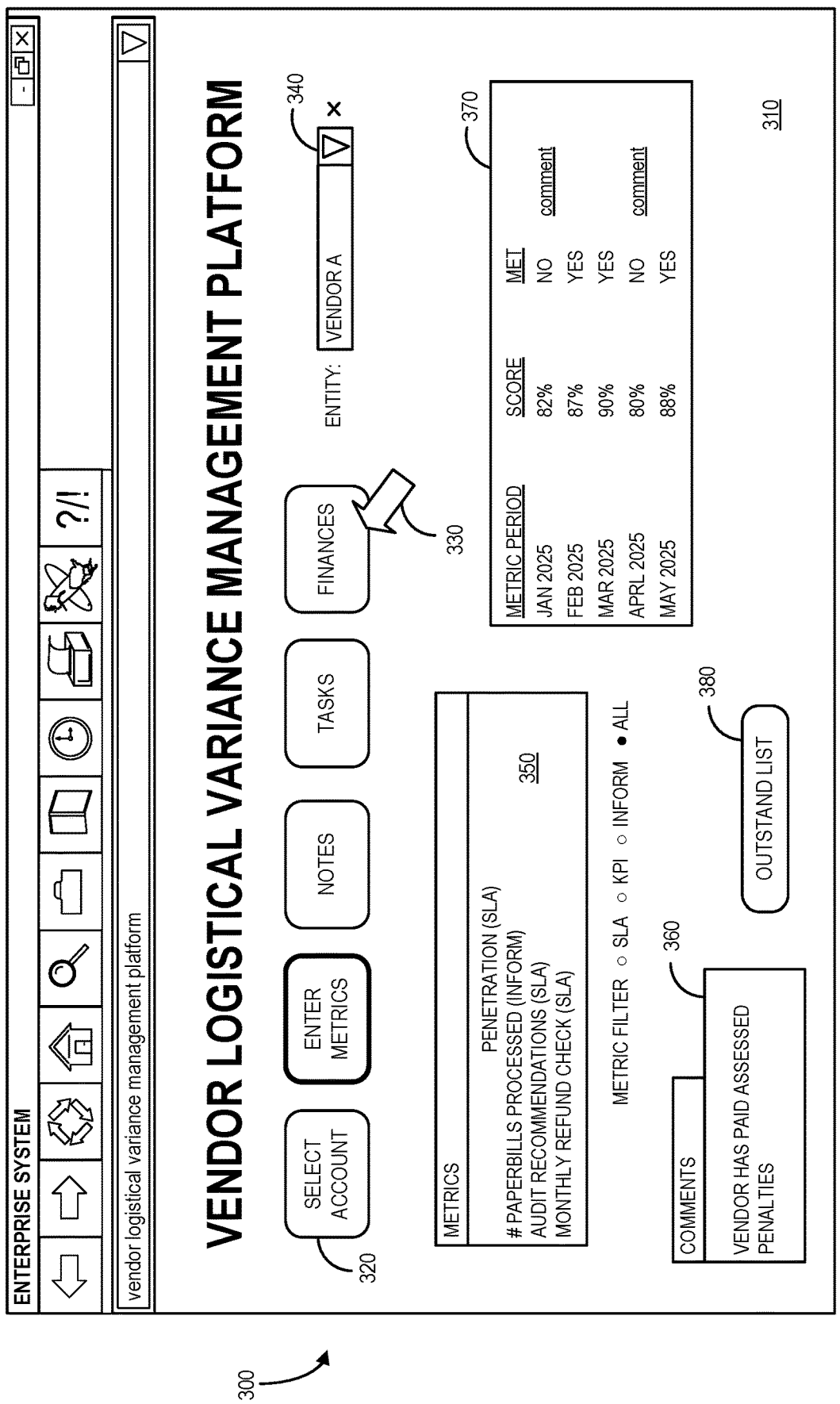
FIG. 3 is a vendor logistical variance management platform display in accordance with some embodiments.

FIG. 3 is vendor logistical variance management platform GUI display 300 in accordance with some embodiments. The display 300 might provide an overall interface 310 of a vendor tool including navigation tiles 320 to "select account," "enter metrics," "notes," "tasks," and "finances" (with "enter metrics" being selected as illustrated by the bold line in FIG. 3). The interface 310 might include, for example, a vendor entity identifier 340 (e.g., selected from a dropdown menu via a touchscreen or computer mouse pointer 330). According to some embodiments, selection of an element (e.g., via touchscreen or a computer mouse pointer 330) might result in a pop-up window providing additional information about that element (e.g., linking to data sources, algorithm parameters, etc.). The interface 310 may also include metrics 350 comments 360, and period-based performance information 370 (e.g., with vendor scores and whether or not benchmark goals were met for that period).

The interface 310 may be associated with a custom-built desktop application that is flexible enough to handle a variety of metric types and frequencies. The desktop application may be modular and scalable for other needs (e.g., incident tracking). The interface 310 may provide a simple way to enter and review metrics, directly add new results to a data mart, an ability to add comments to each metric, track corrective action plans, generate upcoming, due, overdue metrics (e.g., per vendor manager), integrate financials by vendor.

According to some embodiments, the interface 310 further includes a "Outstand List" icon 380 that might be used to navigate to on outstanding metrics list display. For example, FIG. 4 is an outstanding metrics list 400 according to some embodiments. The list 400 may include a vendor director 410, a vendor manager 420, a total count 430, a 1-5 day count 440, a 6-10 day count 450, a 11-15 day count 460, and a 16 day-plus count 470. According to some embodiments, a data mart allows for reporting on vendor manager specific tasks such as the outstanding metrics list 400 or report which displays due and overdue metrics counts by aged buckets. Refreshed daily, the directors 410 may are able to use this list 400 in employee huddles and one-on-one meetings. According to some embodiments, all of the primary metrics captured by the system and/or the vendor manager, including comments and corrective action plans, may be available via the metrics list 400. The system may store the data into a custom data mart for use in reporting and analytics.

Figure 5:
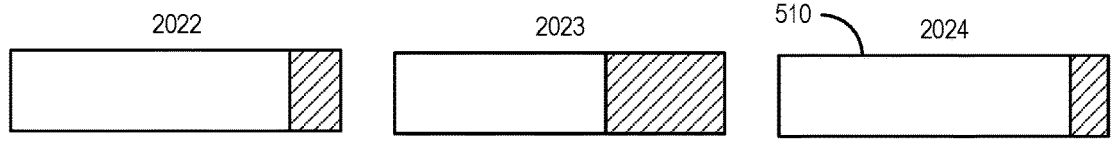
FIG. 5 is a supplier management dashboard in accordance with some embodiments.
Figure 5:
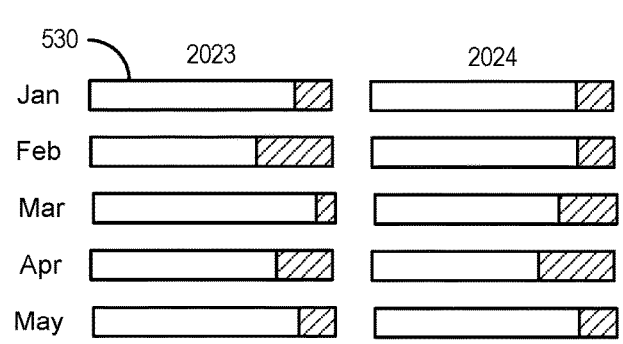

FIG. 5 is a supplier management dashboard 500 in accordance with some embodiments. The dashboard 500 includes graphical supplier management SLA results 510 for multiple years, overall vendor performance by supplier 520 data, and graphical overall supplier management vendor performance 530 on a monthly basis. The master metric dashboard 500 may be available to all vendor managers and other leadership employees. Comprised of multiple views, the SLA dashboard 500 provides both rollup and drill-through reporting on vendor and vendor manager performance. The data is derived from results entered into the system and stored in the data mart. Note that a "metrics meeting" goal calculation might be based on the number of individual metrics meeting goals divided by the total metrics answered (excluding "N/A"). A director dashboard similar to the main dashboard 500 (but tailored to individual director's team results) may provide stacked bar graphs to allow for the immediate visualization of month-over-month and prior year results.

Figure 6:
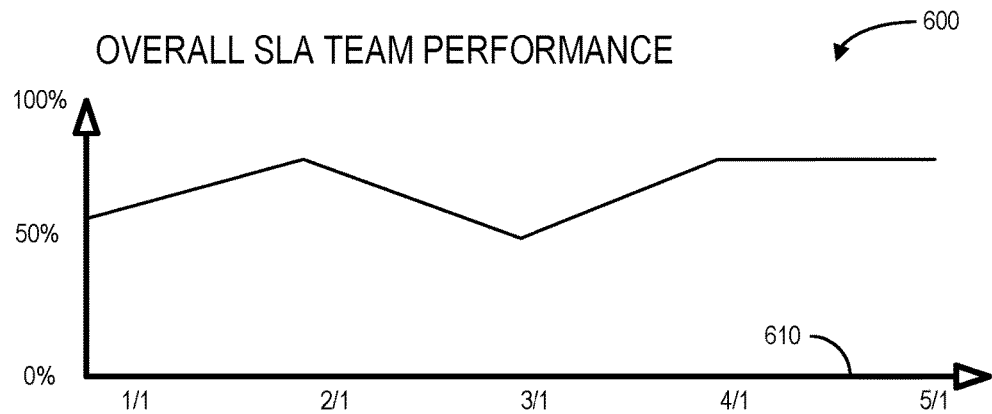
FIG. 6 shows metric tracking information according to some embodiments.

FIG. 6 shows metric tracking information 600 according to some embodiments. The information 600 includes an overall SLA team performance graph 610 and overall vendor SLA rankings 620. Utilizing reporting philosophy, a director huddle card may identify the performance of each vendor manager as well Corrective Action Plans ("CAPs" and individual vendor rankings in the top and bottom department results). Month-over-month, year-to-date, and 12-month rolling scores by vendor manager (meets vs. not-meeting for all vendors under management) may be included. Note that the information may identify vendors under a selected director that are in the top and bottom rankings and CAP activity may include a comparison to the entire organization.

Figure 7:
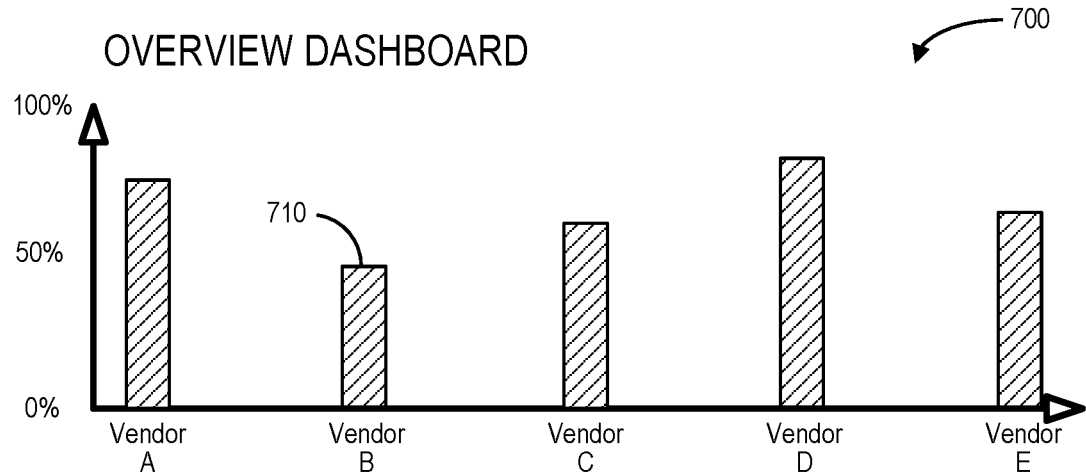
FIG. 7 shows low level scorecards in accordance with some embodiments.

FIG. 7 shows low-level scorecards 700 in accordance with some embodiments. The scorecards 700 include an overall dashboard 710 and a supplier scorecard 720. The scorecards 700 may exist at each level including Line of Business ("LOB"), program, and individual vendor. According to some embodiments, the scorecard 700 showcases data across multiple vendors. FIG. 8 is a supplier management leader report 800 according to some embodiment. Note that senior leader reporting may be completed at the aggregate level with an overview of spend, SLA performance, and benefits summation. In addition, key movements and initiatives may be defined in the notes section for additional context (and total spend under management may be derived from a master spend report described in connection with FIG. 9).

Figure 9:
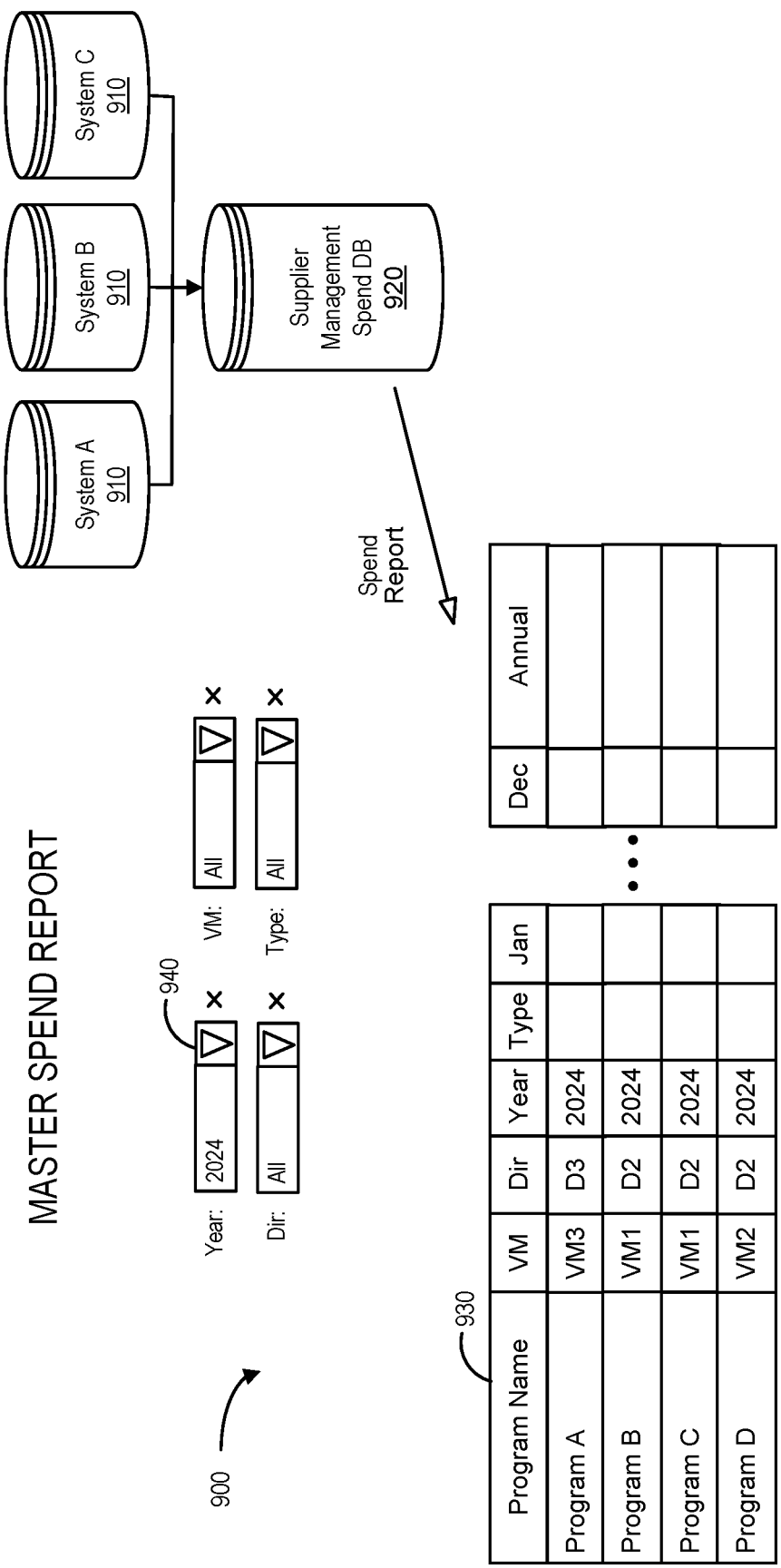
FIG. 9 shows a master spend report system in accordance with some embodiments.

FIG. 9 shows a master spend report system 900 in accordance with some embodiments. Note that claim vendor payments can be made from multiple systems 910 and consolidated in a supplier management spend database 920. The master spend report 930 is created from a database that aggregates payment data into one central data mart. The various systems 910 might include, for example, vendor payments made for service-level items, claim-level payments made to a vendor for auto, property, general liability insurance (excluding bulk-billed payments), bulk-billed payments from vendors, legacy payments, payments to vendors at the claim-level grain, etc.

FIG. 10 shows metric information 1000 according to some embodiments. The metric information 1000 might be associated with, for example, the metric data store 112 of FIG. 1. According to some embodiments, the metric information 1000 includes a supplier name, a metric name, a measurement, a benchmark, a direction (improving or degrading), a metric type, a frequency (monthly, quarterly, yearly, etc.), and a target date.

Figure 11:
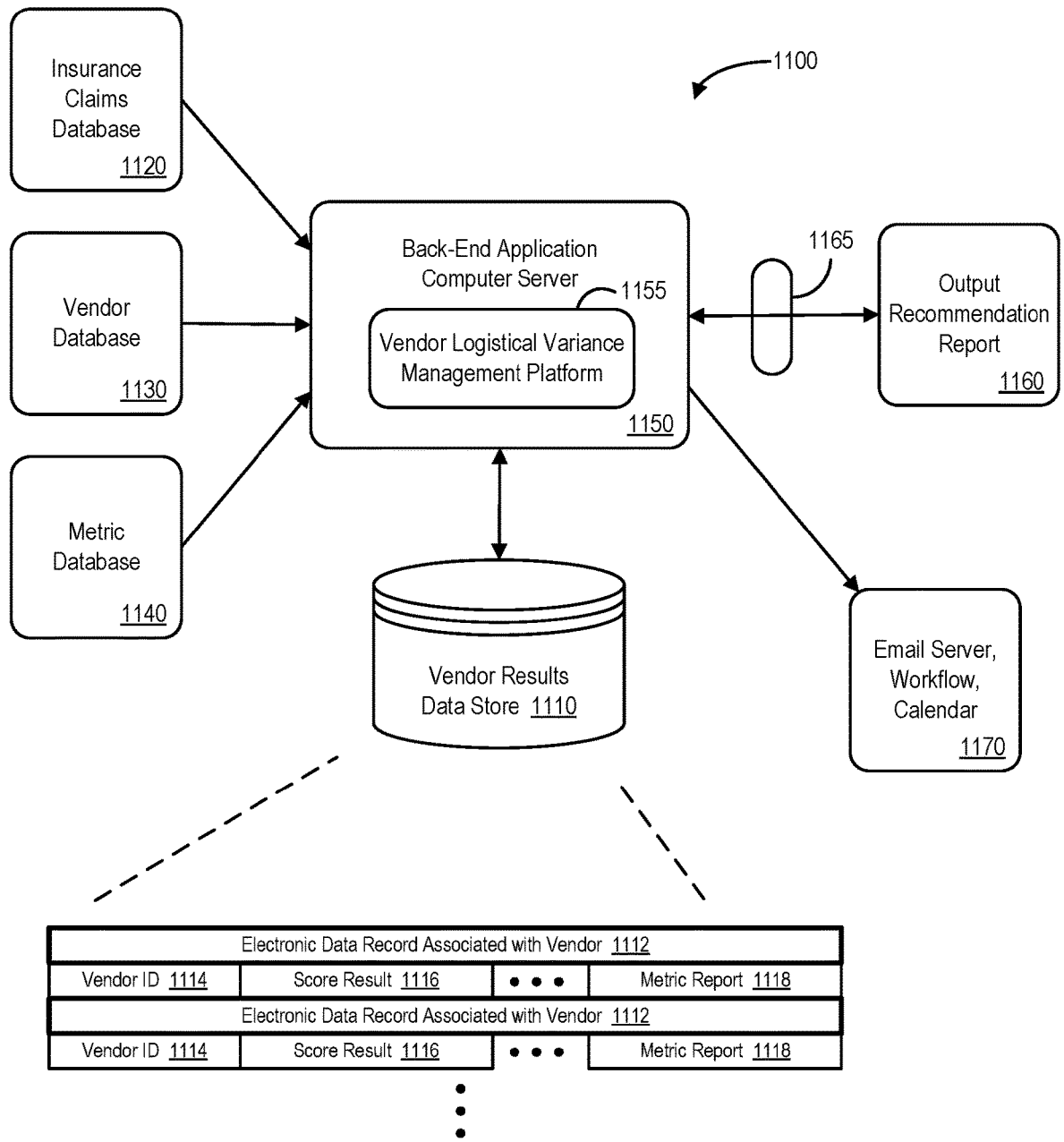
FIG. 11 is a more detailed high-level block diagram of a system architecture in accordance with some embodiments.

FIG. 11 is a more detailed high-level block diagram of a system 1100 in accordance with some embodiments. As before, the system 1100 includes a back-end application computer server 1150 that may access information in a vendor results data store 1110. The back-end application computer server 1150 may also retrieve information from an insurance claims database 1120, a vendor database 1130, and/or a metrics database 1140 in connection with a vendor logistical variance management platform 1155. Note that various data elements from the insurance claims database 1120, the vendor database 1130, and/or the metrics database 1140 might be combined, merged, verified, etc. The back-end application computer server 1150 may also exchange information via communication links to transmit output recommendation reports 1160 (e.g., indicating metric benchmark results via a communication port 1165 that might include a firewall). The back-end application computer server 1150 might also transmit information directly to an email server (e.g., to send or receive information from vendors), a workflow application, and/or a calendar application 1170 (e.g., to schedule corrective actions) to facilitate automated communications and/or other system procedures.

The back-end application computer server 1150 may store information into and/or retrieve information from the vendor results data store 1110. The vendor results data store 1110 might, for example, store electronic records 1112 representing a plurality of entities, each electronic record including a vendor identifier 1114, score results 1116, a communication address, a metric report 1118, etc. According to some embodiments, the system 1100 may also provide a dashboard view of an evaluation process and/or supporting material (e.g., including historical results to help train a machine learning vendor selection algorithm, etc.). In some embodiments, the vendor results data store 1110 might further contain information about one or more corrective action plans that were automatically generated by the vendor logistics variance management platform 1155. This may help the system 1100 help track which types of action plans are effective (e.g., over a relatively long period of time) and which ones are not.

Note that the vendor results data store 1110 may store, for each of thousands of vendors, thousands of performance values and act as a pure analytical data mart. Such an approach may let an enterprise help vendors use data to obtain better results. For example, the vendor results data store 1110 may allow for integration with internal data sources (e.g., the insurance claims database 1120) and let the system 1100 "overlay" vendor data and internal data to identify patterns that would otherwise not be visible (e.g., to help determine why a particular metric is trending down for several different vendors). For example, medical examination quality might be decreasing because an insurer's book of business has shifted and fewer appropriate medical providers are now available for claimants.

Figure 12:
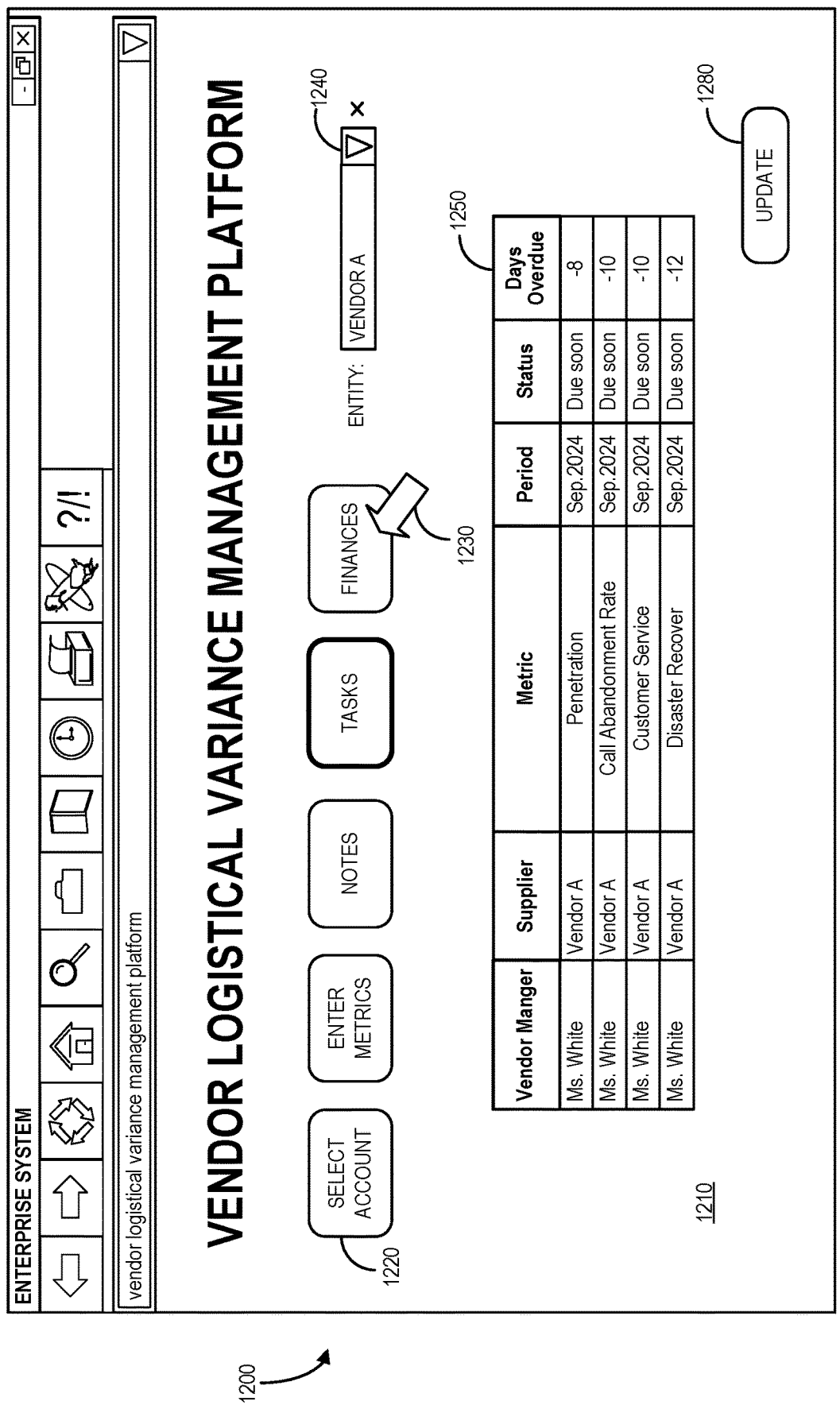
FIG. 12 is a task information display according to some embodiments.

FIG. 12 is a task information display 1200 according to some embodiments. The display 1200 may include an interface 1210 with navigation tiles 1220 (selected via touchscreen or computer mouse pointer 1230) and an entity selection 1240 drop-down menu. The interface 1210 may include task details 1250 such as a vendor manager, supplier, metric, period, status, days overdue, etc. For example, in task tracking each metric may be assigned a "target date" which is based on when the enterprise traditionally obtains the metric. Based on metric frequency, a due date is generated by determining the first day after a period closes (e.g., February 1st for January, April 1st for Q1, etc.) in addition to the target date. In this case, vendor managers have five days from when a metric is due to enter metrics and associated comments. Selection of an "Update" icon 1280 might, according to some embodiments, result in the refresh of information on the interface 1210.

Figure 13:
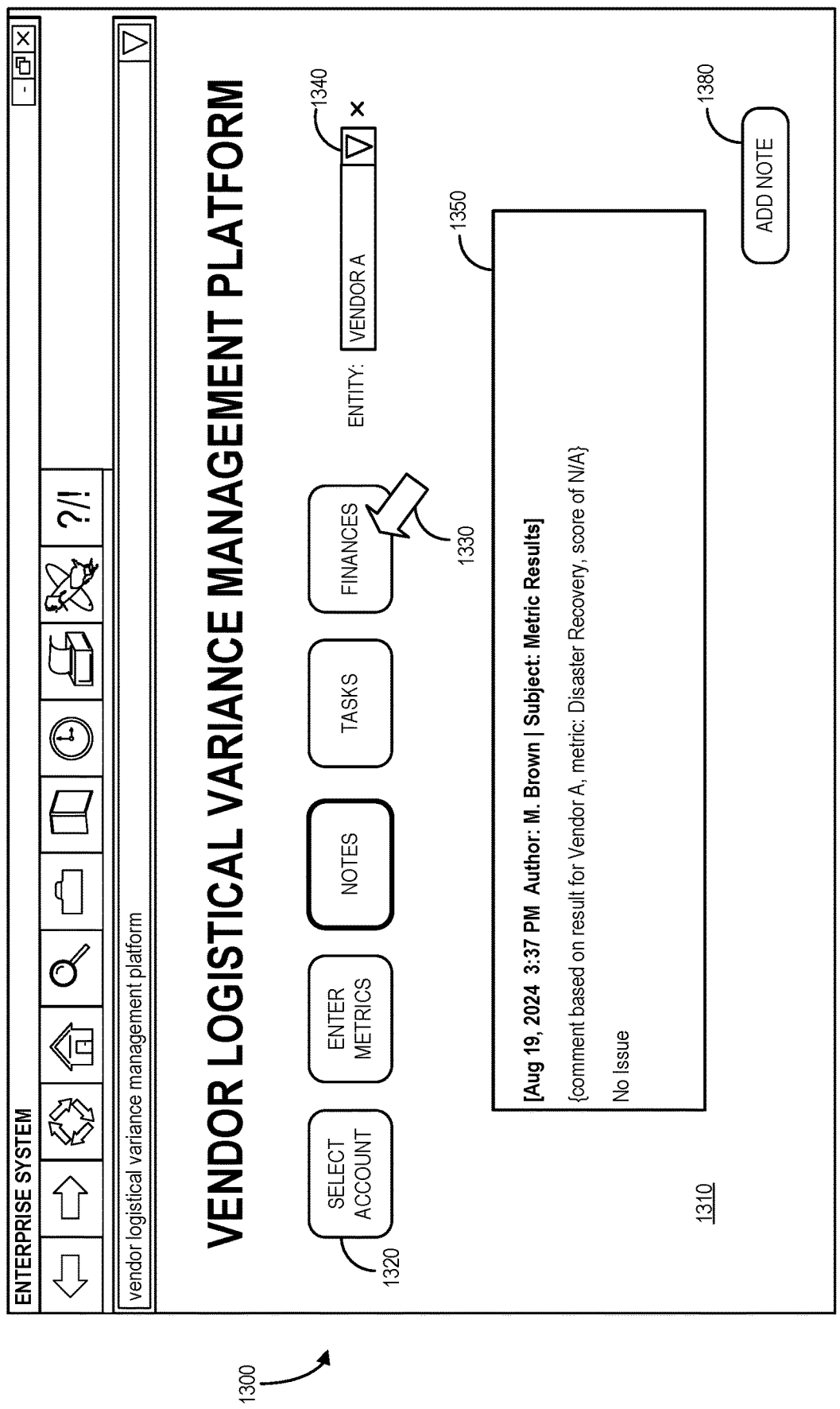
FIG. 13 is a notes information display in accordance with some embodiments.

FIG. 13 is a notes information display 1300 in accordance with some embodiments. The display 1300 may include an interface 1310 with navigation tiles 1320 (selected via touchscreen or computer mouse pointer 1330) and an entity selection 1340 drop-down menu. The interface 1310 may include note details 1350, such as a note date, note time, note author, note subject, comments, etc. In this way, vendor documentation may include vendor notes that contain user-entered comments as well as system generated notes. The note details 1350 may provide an audit trail to indicate when items occurred in chronological order. The note details 1350 may integrate notes from other items (such as an incident tracker) to provide a comprehensive overview of events. According to some embodiments, comments and system notes are not editable and comments can be designated "private" which prevents their usage in reports outside of the system. Selection of an "Add Note" icon 1380 might, according to some embodiments, add additional comments via the interface 1310.

Figure 14:
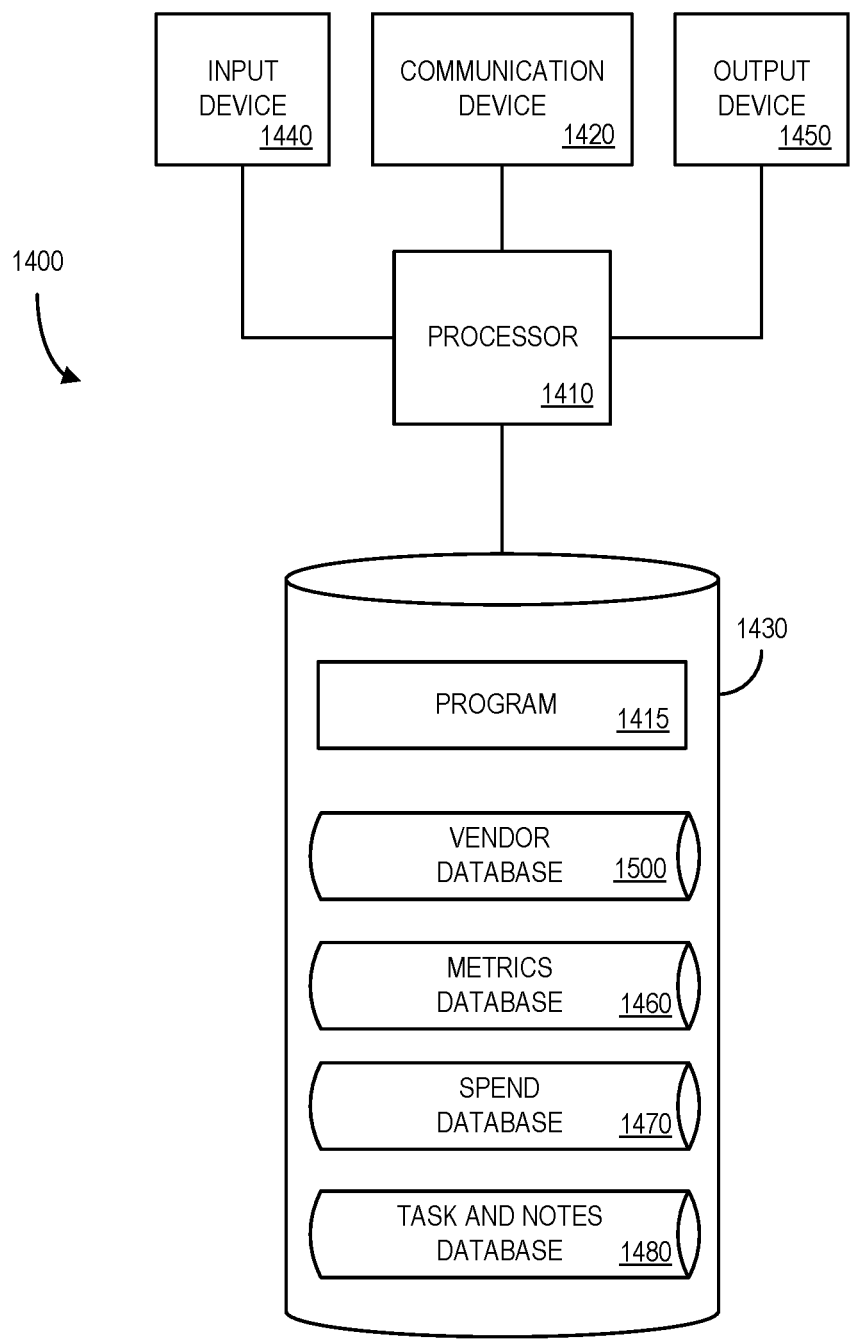
FIG. 14 is a block diagram of an apparatus in accordance with some embodiments of the present invention.

The embodiments described herein may be implemented using any number of different hardware configurations. For example, FIG. 14 illustrates an apparatus 1400 that may be, for example, associated with the systems 100, 1100 described with respect to FIGS. 1 and 11, respectively. The apparatus 1400 comprises a processor 1410, such as one or more commercially available Central Processing Units ("CPUs") in the form of one-chip microprocessors, coupled to a communication device 1420 configured to communicate via communication network (not shown in FIG. 14). The communication device 1420 may be used to communicate, for example, with one or more remote administrator computers and or communication devices (e.g., PCs and smartphones). Note that communications exchanged via the communication device 1420 may utilize security features, such as those between a public internet user and an internal network of the insurance enterprise. The security features might be associated with, for example, web servers, firewalls, and/or PCI infrastructure. The apparatus 1400 further includes an input device 1440 (e.g., a mouse and/or keyboard to enter information about vendors, metric benchmark results, rules and logic, etc.) and an output device 1450 (e.g., to output reports regarding vendor metric results and summaries).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1415 and/or a resource allocation tool or application for controlling the processor 1410. The processor 1410 performs instructions of the program 1415, and thereby operates in accordance with any of the embodiments described herein. For example, the processor 1410 might receive, from a remote device, an indication of a selection of a subset of a plurality of vendor entities associated with an enterprise. The processor 1410 may then access a vendor data store to obtain vendor parameters associated with the subset of vendor entities, wherein the vendor data store contains electronic records representing a plurality of vendor entities, and each electronic record includes an electronic record identifier, vendor parameters, and an electronic communication address. The processor 1410 may then automatically analyze the obtained vendor parameters and data in a metric data store (e.g., benchmark information) to generate vendor logistical variance results for each of the subset of vendor entities. An indication of the vendor logistical variance results may then be transmitted to be displayed on an interactive graphical user interface display that includes at least one electronic communication address from the vendor data store.

The program 1415 may be stored in a compressed, uncompiled and/or encrypted format. The program 1415 may furthermore include other program elements, such as an operating system, a database management system, and/or device drivers used by the processor 1410 to interface with peripheral devices.

As used herein, information may be "received" by or "transmitted" to, for example: (i) the back-end application computer server 1400 from another device; or (ii) a software application or module within the back-end application computer server 1400 from another software application, module, or any other source.

In some embodiments (such as shown in FIG. 14), the storage device 1430 further stores a vendor database 1500 (e.g., containing supplier information), a metrics database 1460, a spend database 1470, and a task and notes database 1480. An example of a database that might be used in connection with the apparatus 1400 will now be described in detail with respect to FIG. 15. Note that the database described herein is only an example, and additional and/or different information may be stored therein. Moreover, various databases might be split or combined in accordance with any of the embodiments described herein. For example, the vendor database 1500 and the metrics database 1460 might be combined and/or linked to each other within the program 1415.

Referring to FIG. 15, a table is shown that represents the vendor database 1500 that may be stored at the apparatus 1400 according to some embodiments. The table may include, for example, entries associated with suppliers of an enterprise. The table may also define fields 1502, 1504, 1506, 1508, 1510 for each of the entries. The fields 1502, 1504, 1506, 1508, 1510 may, according to some embodiments, specify: a vendor identifier 1502, a name 1504, a metric and score 1506, a date 1508, and a status 1510. The vendor database 1500 may be created and updated, for example, based on information electrically received from various operators, administrators, and computer systems (e.g., including those representing metric benchmark scores) that may be associated with an insurer.

The vendor identifier 1502 may be, for example, a unique alphanumeric code identifying a supplier (having the name 1504) who might perform services for an enterprise. The metric and score 1506 may identify, for example, a particular task and how well that vendor performed in connection with that task and the date 1508. The status 1510 might indicate that the vendor is in good standing with the enterprise or that one or more corrective actions might be warranted (e.g., via follow-up tasks).

Thus, embodiments may provide an automated and efficient way for a vendor logistical variance management platform to allow for faster, more accurate results as compared to traditional approaches. Embodiments may improve vendor performance leading to better results for the overall enterprise.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, any of the embodiments may instead be associated with other types of insurance policies in addition to and/or instead of the policies described herein (e.g., professional liability insurance policies, extreme weather insurance policies, new business, policy renewals, issued policies, etc.). Similarly, although certain attributes (e.g., insurance policy values) were described in connection some embodiments herein, other types of attributes might be used instead.

Figure 16:
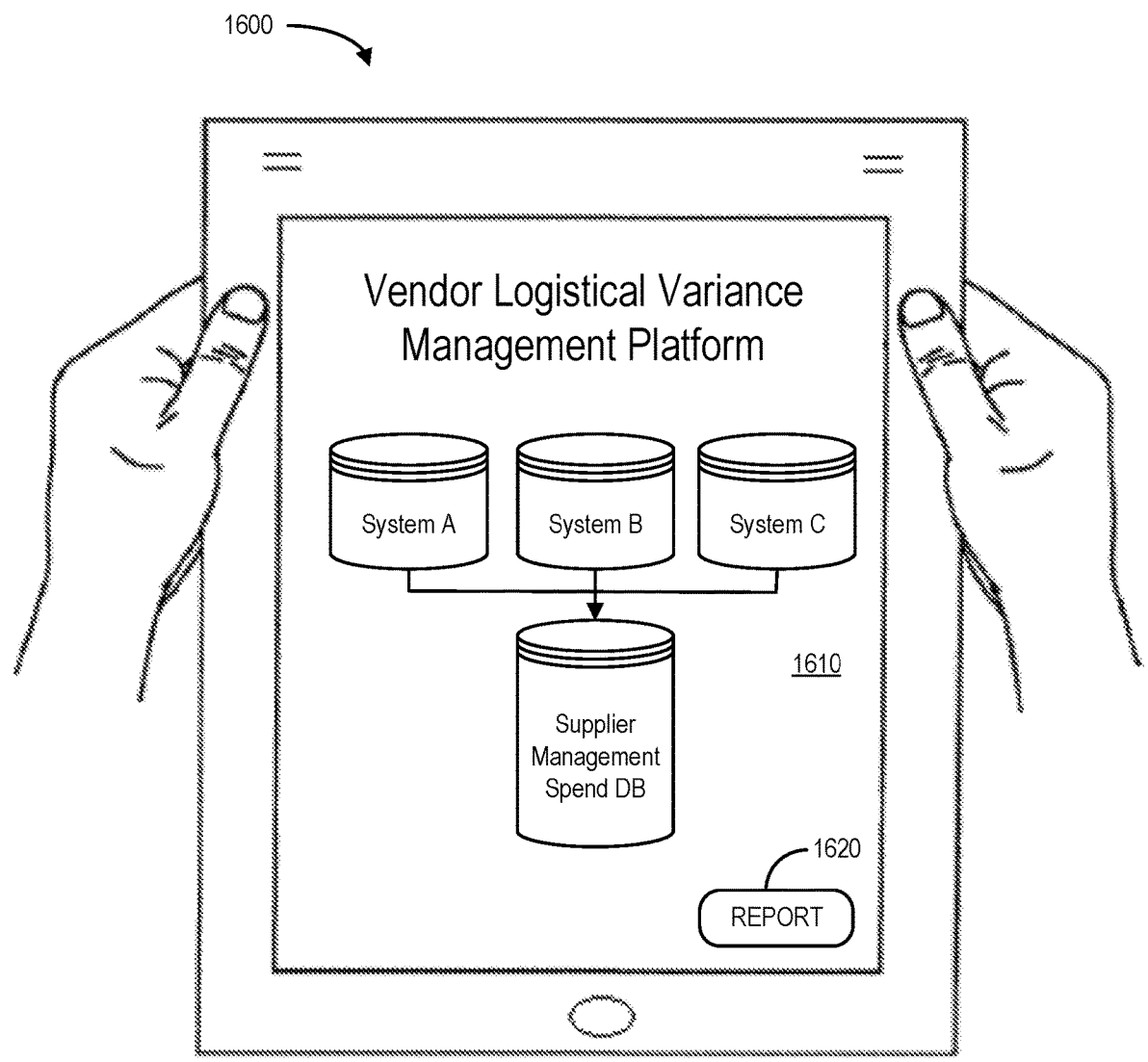
FIG. 16 illustrates a tablet computer displaying an automated spend report tool user interface according to some embodiments.

Further, the displays and devices illustrated herein are only provided as examples, and embodiments may be associated with any other types of user interfaces. For example, FIG. 16 illustrates a handheld tablet computer 1600 showing an automated vendor logistical variance management display 1610 according to some embodiments. The vendor logistical variance management display 1610 might include user-selectable data that can be highlighted and/or modified by a user of the handheld computer 1600 to provide information about potential relationship entity selections (e.g., financial information or metric benchmark results). Moreover, selection of a "Report" icon 1620 may export the values to be used by any of the embodiments described herein, initiate an automatic communication link associated with a task, etc.

Note that the displays described herein might be constantly updated based on new information (e.g., as data is received by the insurer). For example, the displays might be updated in substantially real time or on a periodic basis (e.g., once each night). According to some embodiments, an enterprise might be able to select a particular time in the past and the displays may be updated to reflect the information as it previously existed at that particular time (e.g., how many benchmarks did the vendor fail to meet one year ago?).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:
1. A system to provide an automated vendor logistical variance management platform via a back-end application computer server of an enterprise, comprising:
   (a) a vendor data store containing electronic records that represent a plurality of vendor entities, wherein each electronic record includes an electronic record identifier, vendor parameters, and an electronic communication address;
   (b) a metric data store containing electronic records that represent a plurality logistical metrics, wherein each electronic record includes an electronic record identifier and benchmark information;
   (c) the back-end application computer server, coupled to the vendor data store and metric data store, an email server, workflow application and calendar application, the back-end application computer server including:

a computer processor, and a computer memory, coupled to the computer processor, storing instructions that, when executed by the computer processor, cause the back-end application computer server to:

(i) train a machine learning model using historical results, (ii) receive from a remote device an indication of a selection of a subset of the plurality of vendor entities, (iii) access the vendor data store via an encrypted database management system to obtain the vendor parameters associated with the subset of vendor entities, (iv) overlay the obtained vendor parameters and the data in the metric data store, (v) identify, via the trained machine learning model, at least one pattern based on the overlaid obtained vendor parameter and the data in the metric data store, (vi) automatically generate vendor logistical variance results for each of the subset of vendor entities based on an analysis of the overlaid obtained vendor parameters and data in the metric data store, (vii) determine whether the generated vendor logistical variance results exceed a threshold value, (viii) transmit an indication of the vendor logistical variance results for each of the subset of vendor entities, (ix) generate a plurality of low-level score cards across multiple vendors, (x) automatically update a display of data on a same interactive user interface in real time without input from a user, wherein the display on the same user interface includes a first score card generated for multiple vendors and a second score card for each individual vendor, wherein the second score card for the individual vendor includes a vendor performance metric, a vendor initiative metric, a financing metric, a description of a benchmark for each metric and a year-to-date progress indication for each benchmark based on a benchmark goal, an improving or degrading direction of vendor performance with respect to the benchmark goal and a target date for the benchmark goal;

(xi) automatically establish a communication link and provide information to the calendar application, wherein the communication link is established between the remote user device and a remote vendor device;

(xii) automatically schedule a corrective action per a corrective action plan based on the determination the generated vendor logistical variance results exceed the threshold value;

(d) a communication port coupled to the back-end application computer server to facilitate an exchange of data with the remote user device in support of an interactive graphical user interface display via security features and a distributed communication network, the interactive graphical user interface display including vendore logistical variance results for each of the subset of vendor entities and at least one electronic communication link from the vendor data store, and wherein:

the back-end application computer server receives selection of an entity identifier element and transmits information in accordance with the selected entity identifier element to present on the interactive graphical user interface without transmitting information not in accordance with the selected entity identifier element, thereby reducing a number of electronic messages that are transmitted and improving operation of the system;

the at least one electronic communication address is included when it is determined at least one vendor logistical variance result exceeds the threshold value; and in a case the threshold value is exceeded, the back-end application computer server automatically and in response to the determination the threshold value is exceeded, generates the corrective action plan based on the trained machine learning model.

2. The system of claim 1, wherein the vendor logistical variance is associated with performance measurement.

3. The system of claim 1, wherein the vendor logistical variance is associated with financial control.

4. The system of claim 1, wherein the vendor logistical variance is associated with relationship management.

5. The system of claim 1, wherein the vendor logistical variance is associated with at least one of: (i) a service level agreement metric, (ii) a key performance indicator metric, and (iii) an informational metric.

6. The system of claim 1, wherein a single vendor manager is associated with multiple vendor entities and vendor logistical variance results are combined and summarized for the vendor manager.

7. The system of claim 1, wherein the information in the metric data store includes at least one of: (i) a metric name, (ii) a measurement type, (iii) a current benchmark, (iv) a benchmark direction, (v) a metric type, (vi) a metric frequency, and a (vii) a target date.

8. A computerized method to provide an automated vendor logistical variance management platform via a back-end application computer server of an enterprise, comprising:

training a machine learning model using historical results;

receiving, at the back-end application computer server from a remote device, an indication of a selection of a subset of the plurality of vendor entities;

accessing a vendor data store via an encrypted database managment system to obtain vendor parameters associated with the subset of vendor entities, wherein the vendor data store contains electronic records representing a plurality of vendor entities, and each electronic record includes an electronic record identifier, the vendor parameters, and an electronic communication address;

overlaying the obtained vendor parameters and the data in the metric data store;

identifying, via the trained machine learning model, at least one pattern based on the overlaid obtained vendor parameters and the data in a metric data store;

automatically generating vendor logistical variance results for each of the subset of vendor entities based on an analysis of the overlaid obtained vendor parameters and data in the metric data store;

determining whether the generated vendor logistical variance results exceed a threshold value, wherein the metric data store contains electronic records representing a plurality logistical metrics, and each electronic record includes an electronic record identifier and benchmark information;

transmitting an indication of the vendor logistical variance results for each of the subset of vendor entities to be displayed, via security features, on an interactive graphical user interface display that includes at least one electronic communication link from the vendor data store, generating a plurality of low-level score cards across multiple vendors, automatically, updating a display of data on a same interactive graphical user interface in real time without input from a user, wherein the display on the same interactive graphical user interface includes a first score card generated for multiple vendors and a second score card for each individual vendor, wherein the second scorecard for the individual vendor includes a vendor performance metric, a vendor initiative metric, a financing metric, a description of a benchmark for each metric and a year-to-date progress indication for each benchmark based on a benchmark goal, an improving or degrading direction of vendor performance with respect to the benchmark goal and a target date for the benchmark goal;

automatically, when a vendor logistical variance result exceeds a threshold value, and in response to the determination the threshold value is exceeded:
(i) generating a corrective action plan based on the trained machine learning model,
(ii) establishing a communication link between the remote user device and a remote vendor device, and
(iii) providing, via the established communication link, information to a calendar application to schedule corrective action per the corrective action plan based on the determination the threshold value is exceeded;

receiving selection of an entity identifier element; and transmitting information in accordance with the selected entity identifier element to present on the interactive graphical user interface without transmitting information not in accordance with the selected entity identifier element, thereby reducing a number of electronic messages that are transmitted and improving operation of the logistical variance management platform via a back-end application computer server.

9. The method of claim 8, wherein the vendor logistical variance is associated with performance measurement.

10. The method of claim 8, wherein the vendor logistical variance is associated with financial control.

11. The method of claim 8, wherein the vendor logistical variance is associated with relationship management.

12. The method of claim 8, wherein the vendor logistical variance is associated with at least one of: (i) a service level agreement metric, (ii) a key performance indicator metric, and (iii) an informational metric.

13. The method of claim 8, wherein a single vendor manager is associated with multiple vendor entities and vendor logistical variance results are combined and summarized for the vendor manager.

14. The method of claim 8, wherein the information in the metric data store includes at least one of: (i) a metric name, (ii) a measurement type, (iii) a current benchmark, (iv) a benchmark direction, (v) a metric type, (vi) a metric frequency, and a (vii) a target date.

15. A non-transitory, computer-readable medium storing instructions, that, when executed by a computer processor, cause the computer processor to perform a method to provide an automated vendor logistical variance management platform via a back-end application computer server of an enterprise, the method comprising:

training a machine learning model using historical results;

receiving, at the back-end application computer server from a remote device, an indication of a selection of a subset of the plurality of vendor entities;

accessing a vendor data store via an encrypted database management system to obtain vendor parameters associated with the subset of vendor entities, wherein the vendor data store contains electronic records representing a plurality of vendor entities, and each electronic record includes an electronic record identifier, the vendor parameters, and an electronic communication address;

overlaying the obtained vendor parameters and the data in the metric data store;

identifying, via the trained machine learning model, at least on pattern based on the overlaid obtained vendor parameters and the data in a metric data store;

automatically generating vendor logistical variance results for each of the subset of vendor entities based on an analysis of the overlaid obtained vendor parameters and data in the metric data store;

determining whether the generated vendor logistical variance results exceed a threshold value, wherein the metric data store contains electronic records representing a plurality logistical metrics, and each electronic record includes an electronic record identifier and benchmark information;

transmitting an indication of the vendor logistical variance results for each of the subset of vendor entities to be displayed, via security features, on an interactive graphical user interface display that includes at least one electronic communication link from the vendor data store, generating a plurality of low-level score cards across multiple vendors, automatically updating a display of data on a same interactive graphical user interface in real time without input from a user, wherein the display on the same interactive graphical user interface includes a first score card generated for multiple vendors and a second score card for each indiviual vendor, wherein the second score card for the individual vendor includes a vendor performance metric, a vendor initiative metric, a financing metric, a description of a benchmark for each metric and a year-to-date progress indication for each benchmark based on a benchmark goal, an improving or degrading direction of vendor performance with respect to the benchmark goal and a target date for the benchmark goal;

automatically, when a vendor logistical variance result exceeds a threshold value and in response to the determination the threshold voalue is exceeded:
(i) generating a corrective action plan based on the trained machine learning model;
(ii) establishing a communication link between the remote user device and a remote vendor device; and
(iii) providing, via the estblished communication link, information to a calendar application to schedule corrective action per the corrective action plan based on the determination the threshold value is exceeded;

receiving selection of an entity identifier element and transmitting information in accordance with the selected entity identifier element to present on the interactive graphical user interface without transmitting information not in accordance with the selected entity identifier element, thereby reducing a number of electronic messages that are transmitted and improving operation of the automated vendor logistical variance management platform via a back-end application computer server.

16. The medium of claim 15, wherein the information in the metric data store includes at least one of: (i) a metric name, (ii) a measurement type, (iii) a current benchmark, (iv) a benchmark direction, (v) a metric type, (vi) a metric frequency, and a (vii) a target date.

17. The system of claim 1, wherein the low-level score card is generated for each level of line of business and program.

\* \* \* \* \*